United States Patent
Dulaney et al.

[11] Patent Number: 6,002,102
[45] Date of Patent: Dec. 14, 1999

[54] HIDDEN SURFACE LASER SHOCK PROCESSING

[75] Inventors: Jeff L. Dulaney, Dublin; Allan H. Clauer, Worthington; Steven M. Toller, Grove City; Craig T. Walters, Columbus, all of Ohio

[73] Assignee: LSP Technologies, Inc., Dublin, Ohio

[21] Appl. No.: 08/806,094

[22] Filed: Feb. 25, 1997

[51] Int. Cl.$^6$ .................................................. B23K 26/00
[52] U.S. Cl. ....................................... 219/121.85; 148/525
[58] Field of Search ...................... 219/121.69, 121.85, 219/121.65, 121.66, 121.74; 148/525, 565

[56] References Cited

U.S. PATENT DOCUMENTS

| | | | |
|---|---|---|---|
| 3,803,379 | 4/1974 | McRay et al. | 219/121.69 |
| 4,303,137 | 12/1981 | Fischer | 148/525 X |
| 4,885,751 | 12/1989 | Terreur | 219/121.69 |
| 5,225,650 | 7/1993 | Babel et al. | 219/121.69 |
| 5,492,447 | 2/1996 | Mannava et al. | 415/200 |
| 5,525,429 | 6/1996 | Mannava et al. | 148/525 X |
| 5,571,575 | 11/1996 | Takayanagi | 427/9 |
| 5,601,737 | 2/1997 | Asahi et al. | 219/121.85 |
| 5,719,376 | 2/1998 | Snyder et al. | 219/121.85 |

FOREIGN PATENT DOCUMENTS

| | | |
|---|---|---|
| 0416988 | 12/1994 | European Pat. Off. . |
| 2-19421 | 1/1990 | Japan . |
| 5-337672 | 12/1993 | Japan . |
| 6-45295 | 2/1994 | Japan . |
| 7-51941 | 2/1995 | Japan . |
| 7-246483 | 9/1995 | Japan . |

*Primary Examiner*—Gregory Mills
*Attorney, Agent, or Firm*—Randall J. Knuth

[57] ABSTRACT

The invention includes a laser processing method for processing a hidden surface of a workpiece, the hidden surface disposed within a recess having an opening. The method comprises inserting a reflective member into the recess and directing a pulse of coherent energy to reflect off of said reflective member and impact the hidden surface of workpiece to create a shock wave. Alteratively a surface of the recess may be modified to laser shock process the hidden surface.

3 Claims, 5 Drawing Sheets

HIDDEN SURFACE LASER SHOCK PROCESSING

BACKGROUND OF THE INVENTION

1. Field of the Invention

The present invention relates to the use of coherent energy pulses, as from high power pulsed lasers, in the shock processing of solid materials, and, more particularly, to methods and for improving properties of solid materials by providing shock waves therein where the laser beam impacts the solid material on a hidden surface. The invention is especially useful for enhancing or creating desired physical properties such as hardness, strength, and fatigue strength.

2. Description of the Related Art

Known methods for shock processing of solid materials, particularly laser shock processing solid materials, typically using coherent energy as from a laser, orient the laser beam normal, i.e., perpendicular to the workpiece.

When particular constraints of processing are created, based on the shape of the material or other geometric factors such as when attempting to laser shock harden integrally bladed rotors (IBR's), blind bores, slots, or dovetail sections, the laser beam may not have a direct, line of sight access to the area to be shock processed.

Laser shock processing techniques and equipment can be found in the U.S. Pat. No. 5,131,957 to Epstein 5,131,957, along with that of U.S. Pat. Ser. No. 08/547,012 entitled LASER PEENING PROCESS AND APPARATUS, assigned to the assignee of the present invention and hereby incorporated by reference.

Known laser shock processing systems tend to form a relatively small in cross sectional area, laser beam impacting on the surface of the workpiece. This has been accomplished since to sufficiently work a surface of workpiece, sufficient laser energy must be applied over a particular area. The smaller the area with the same amount of energy leads to a greater energy per unit area application. The more energy per unit area applied, the deeper the residual compressive stresses are applied to the workpiece.

Laser shock processing of hidden surfaces would benefit particular types and areas of workpieces if such could be accomplished.

What is needed in the art is a way to modify the laser beam to consistently and uniformly work hidden areas of the workpiece.

SUMMARY OF THE INVENTION

The present invention provides a method of laser shock processing that can be used in a production environment to apply laser shock processing treatment to hidden surfaces once thought not applicable for treatment.

The present invention includes use of a reflective member inserted into a recess of the workpiece. The reflective member is created to reflect an inbound laser beam to the hidden surface within the workpiece. Different geometries and forms of the reflective member are given, some dependent on the shape of the recess.

The term recess as used in this application is that of an opening, port, hole, channel, or other space within the workpiece. The term hidden surface as used in this application is an interior surface of the workpiece, not normally available for direct line-of-sight laser processing. Typical recesses with hidden surfaces include, the interior surfaces that define holes and blind bores, the interior roof of dovetail slots as can be found in aircraft gas turbine disks, and other similar openings and ports in workpieces.

The invention, in one form thereof, comprises a laser processing method for processing a hidden surface of a workpiece, the hidden surface disposed within a recess having an opening. The method comprises the steps of inserting a reflective member into the recess; and directing a pulse of coherent energy to reflect off of said reflective member and impact the hidden surface of the workpiece to create a shock wave. In one embodiment, the laser processing method uses a metal focusing mirror as the reflective member. Alternatively the reflective member comprises; metal foil or some other material having a metalized or other reflective surface coating.

In another form of the invention the reflective member is shaped to permit insertion of itself into the recess. In yet another embodiment the reflective member is formed so as to permit directing a single pulse to two hidden surfaces.

Another form of the invention includes forming the reflective member into an object having a substantial cone shaped cross section.

In yet another form of the invention, a movable coated or uncoated reflective film, tape, or foil is placed across a shaped member placed inside the recess.

In still another form of the invention, reflective particles are suspended in a laser transparent material.

The invention, in another form thereof, comprises a laser processing method for processing a hidden surface of a workpiece, the hidden surface disposed within a recess having an opening. The method comprises the steps of modifying an inner surface of said recess to reflect pulses of coherent energy; and directing a pulse of coherent energy to reflect off of said modified surface and impact the hidden surface of workpiece to create a shock wave. Alternate ways of modifying an inner surface include coating or painting a reflective finish thereon or polishing such inner surface to act as a mirror.

The invention, in yet another form thereof, includes a laser processing method for processing a hidden surface of a workpiece, the hidden surface disposed within a recess having an opening. The method comprising the steps of providing a pulse of coherent energy; and directing the pulse of coherent energy through a majority of the opening so the pulse may impact the hidden surface.

An advantage of the present invention is that hidden surfaces of a workpiece may now be effectively laser shock processed.

Another advantage is that the hidden surfaces may be laser shock processed in a production environment.

A further advantage of the present invention is now it is able to precisely control the laser beam inside the workpiece.

Yet another advantage of the present invention is that by applying lower powered laser energy through a majority of the opening of the recess, the energy per unit area remains small, reducing negative effects, until reflected and focused by the reflective member. Such lower power laser beam use, spread out over the recess opening, but later focused to the power density necessary for laser shock processing, increases the effectiveness and possibly the operational lifetime of the reflective member or reflective surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the results of residual compressive stresses developed in the irradiated surface that retard fatigue crack initiation and/or slowing of crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more through background and the prior history of laser shock processing and high powered processing of engineered materials, reference can be made to U.S. Pat. No. 5,131,957. This patent shows the type of laser and laser circuit adaptable for use with the present invention. Another type of laser adaptable for use with the invention, is that with a ND-Glass Laser manufactured by LSP Technologies, of Dublin, Ohio.

Figure 1:
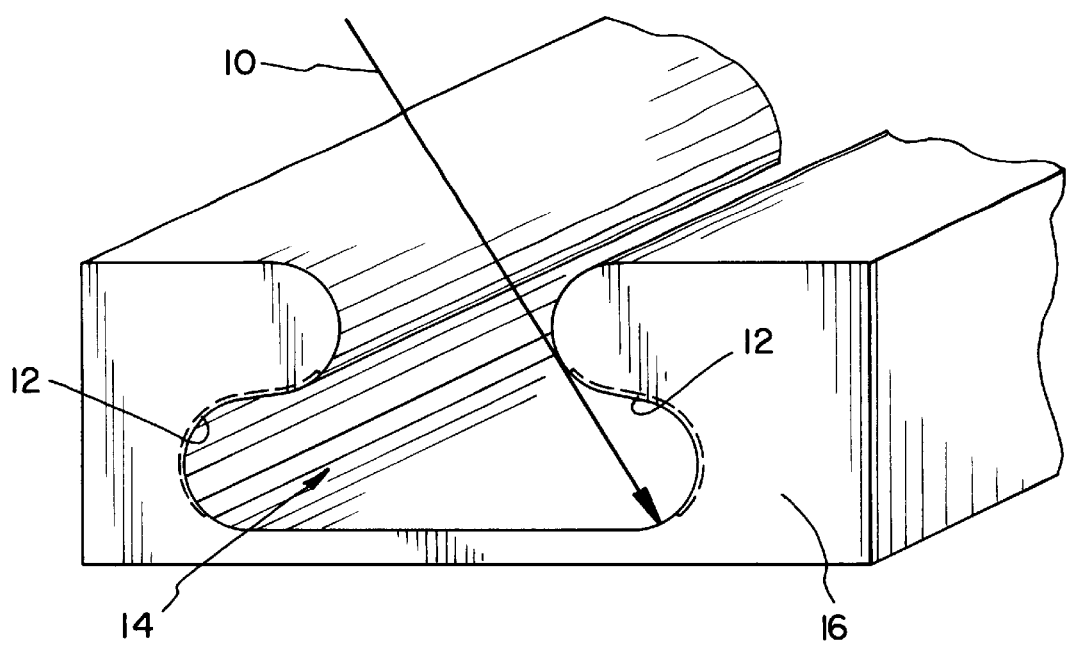
FIG. 1 is a sectional perspective view of a workpiece having a hidden surface to a laser beam from conventional laser shock processing.

The present invention solves the problem as shown in FIG. 1 in which a laser beam 10 provided from a laser shock processing system is unable to access and process hidden surfaces 12 disposed in recess 14 of workpiece 16. Although the examples of this application use a dovetail-shaped recess in the circumference of a disk and a blind bore, numerous other geometries are possible that create such a hidden surface 12 either partially or completely not in direct line-of-sight with the outer surface of workpiece 14.

The method of the invention provides for either inserting a reflective member 20 within the recess to alter the path of the laser beam 10 (a coherent pulse of energy), or modifying an inner surface of recess 14 to then reflect such laser beam 10. Such reflected laser beam is caused to impact hidden surface 12, thereby laser shock processing the surface. After such processing, the workpiece can be further machined and manufactured for instance into an aircraft gas turbine engine disk.

Figure 2:
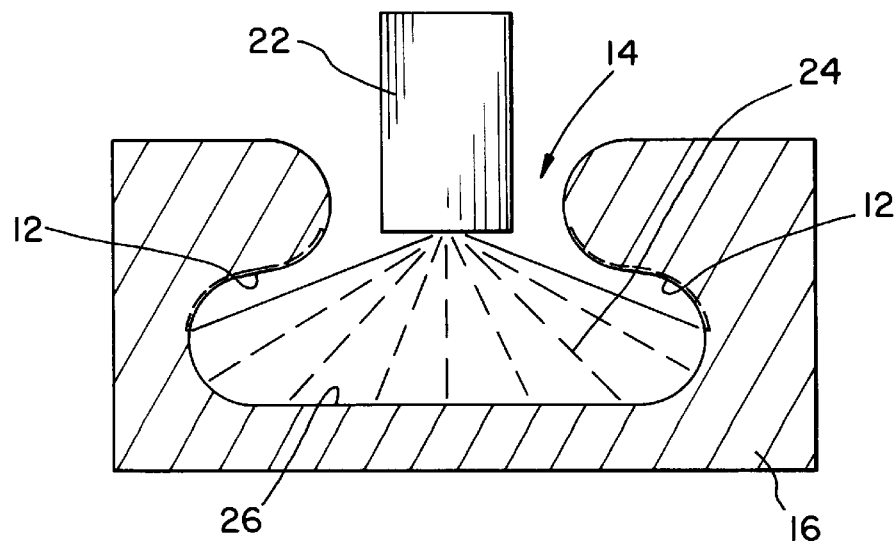
FIG. 2 is a sectional view of a workpiece during application of a reflective coating on an inner surface.

FIG. 2 shows the second method in which an applicator head 22 is spraying a reflective coating 24 such as metal paint, silver coat, or another highly reflective coating or paint, at least in the frequency range of laser beam 10. Other types of coatings may equivalently be used as long as an incident laser beam 10 entering recess 14 will be reflected toward hidden surface 12. Laser processing hidden surface 12 is then simply a matter of applying laser energy at correct angle to impact the intended portion of hidden surface 12.

Additionally and equivalently, it may be possible, with some types of workpieces, especially those made from high reflective stainless steels, to simply polish the inner bottom surface 26 to create the necessary reflective surface.

Figure 3:
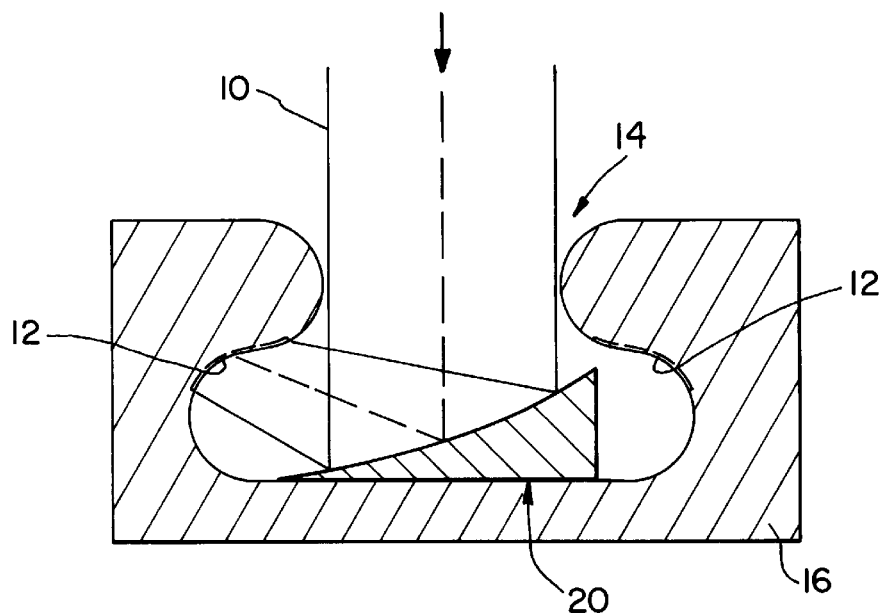
FIG. 3 is a sectional view of a workpiece having a reflective element disposed with the recess focussing an incoming laser beam to the hidden surface.

FIG. 3 shows a reflective member 20 inserted into recess 14. Reflective member 20 may be formed from almost any material found to withstand the pressures created by laser shock processing. A requirement is that member 20 have some type of reflective coating thereon, such as silver, gold or copper, or integrally formed by member 20 itself.

Preferably member 20 would be constructed in long, flexible strips such that during processing such member could be quickly indexed through recess 14 during the laser shock process. Additionally, such member could be constructed to be disposable after use or heavily constructed so that after use only a sacrificial coating of reflective member 20 has been destroyed. Such a member 20 could then be recycled and equipped with a new reflective surface for use with the method once more.

As shown in FIG. 3, reflective member may take the form of a metal type lens to focus incoming laser beam 10 to particular portions of hidden surface 12. Numerous geometries of reflective member 20 may be used, since there are numerous geometries of recesses and hidden surfaces.

Figure 4:
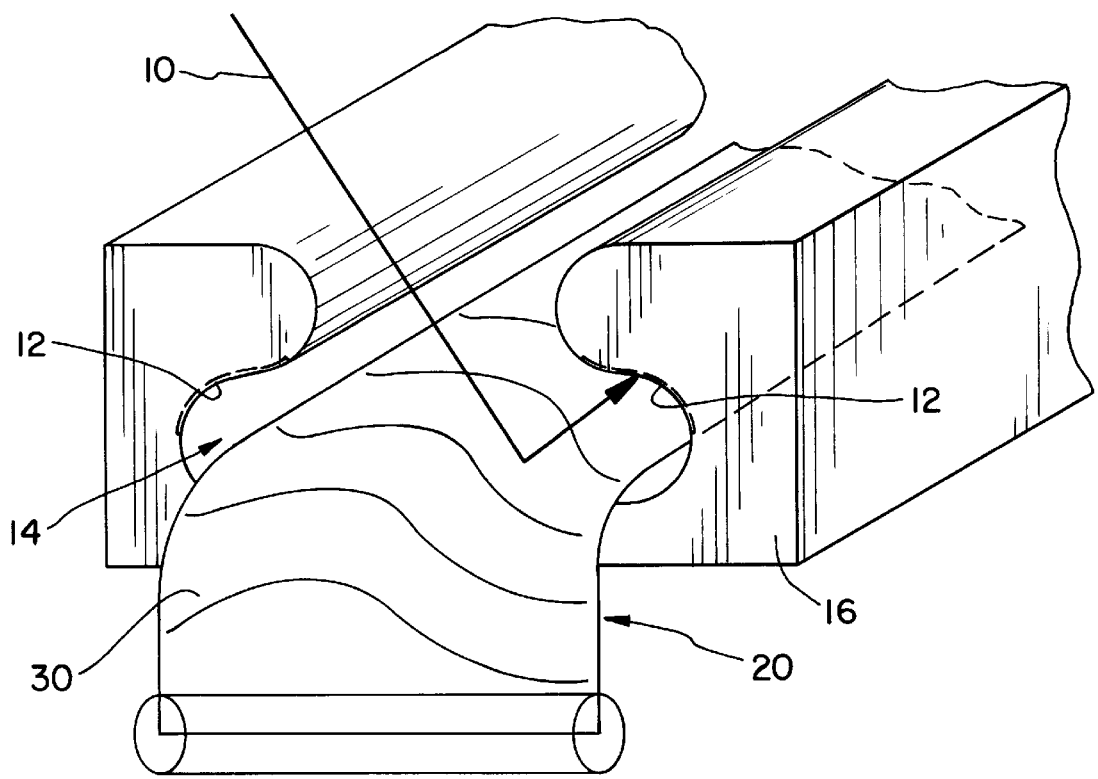
FIG. 4 is a sectional diagrammatic view of one embodiment of the present invention showing a reflective foil used to focus the laser beam on the hidden surface.

FIG. 4 shows an alternate embodiment of reflective member 20, in that it comprises a reflective foil 30, able to be inserted into recess 14. Such reflective foil could be made from silver or mica or other reflective tape or be comprised of a reflective coating applied to another type material and formed to direct laser beam 10 to a desired area of hidden surface 12. The tape or foil could be indexed over a formed surface or an insert, such as shown in FIG. 3, to provide a renewable reflecting surface.

Figure 5:
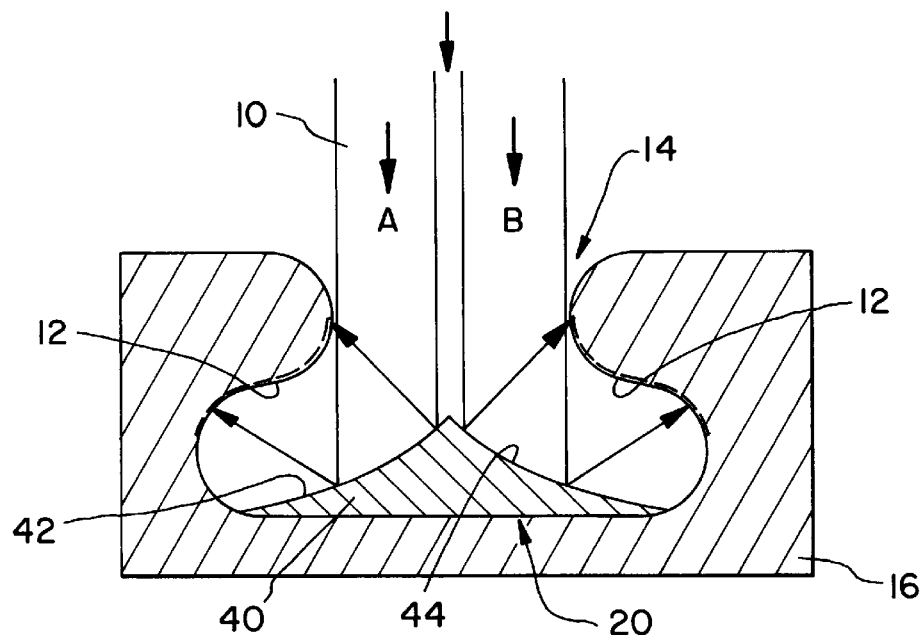
FIG. 5 is another embodiment of the present invention using a formed reflective member capable of splinting the incoming laser beam so as to process two hidden surfaces with one laser beam.

FIG. 5 shows an other alternate embodiment in which reflective member 20 is a roof-shaped reflector 40 having two or more reflecting portions 42 and 44. These portions enable a single beam 10 to be applied to more than a single hidden surface 12. Once again the specific angles of portions 42 and 44 would depend on the geometry of recess 14 and the location of hidden surfaces 12.

Another novel feature shown in FIG. 5 is that of utilizing a larger laser beam 10 encompassing a majority of the opening of recess 14. The inventors have discovered that by utilizing as much of the entrance opening of recess 14 as possible for the beam path, the applied energy density at the reflector member 20 or reflective surface on inner surface 26 is at its lowest. This lowering of the energy density increases the operational efficiency and lifespan of the reflective member 20 or surface 26. Such reduction of laser energy is not noticeable at the laser worked surfaces on hidden surfaces 12 since the laser beam 10 is focused back to an operational power density at the workpiece surface by the reflective member 20 or surface 26.

Figure 6:
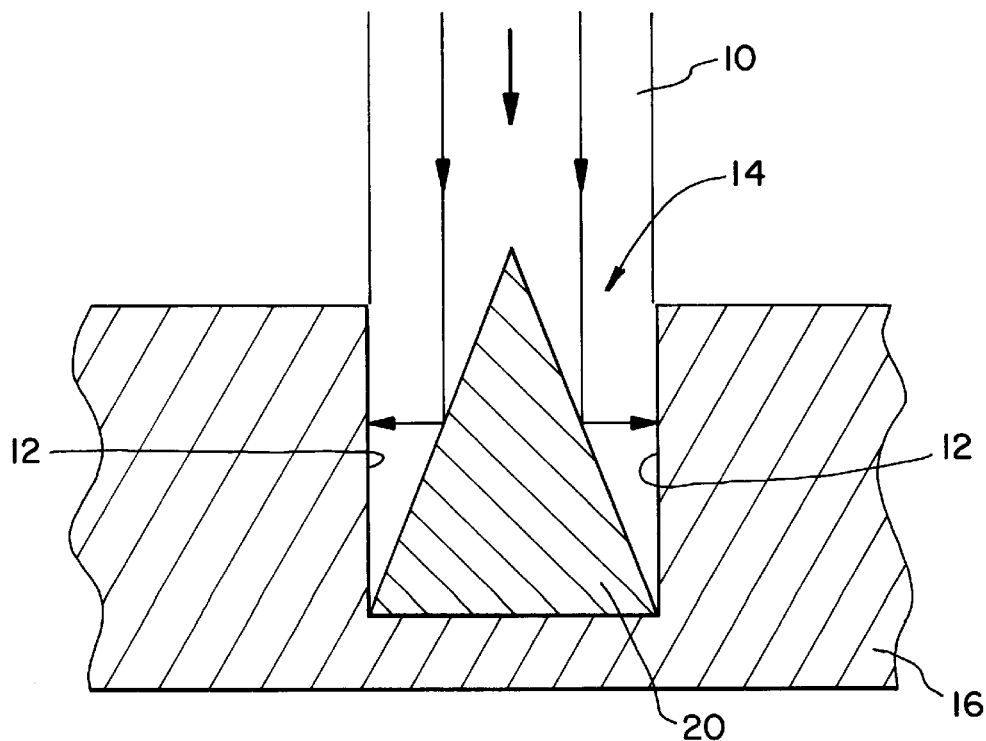
FIG. 6 is another embodiment of the present invention using a reflective member having a cone shaped cross section for processing the hidden surface forming the edges of a bore or hole.

FIG. 6 shows another configuration of reflective member 20, that of a substantially cone-shaped piece interfit into recess 14 (more specifically a bore or opening within workpiece 16). In this case recess 14 is defined by hidden surface 12. Application of laser energy is supplied by laser beam 10 passing down recess 14, reflecting off of member 20 and thereby impacting hidden surface 12. In this embodiment, laser shock processing occurs simultaneously about the entire hidden surface 12.

Figure 7:
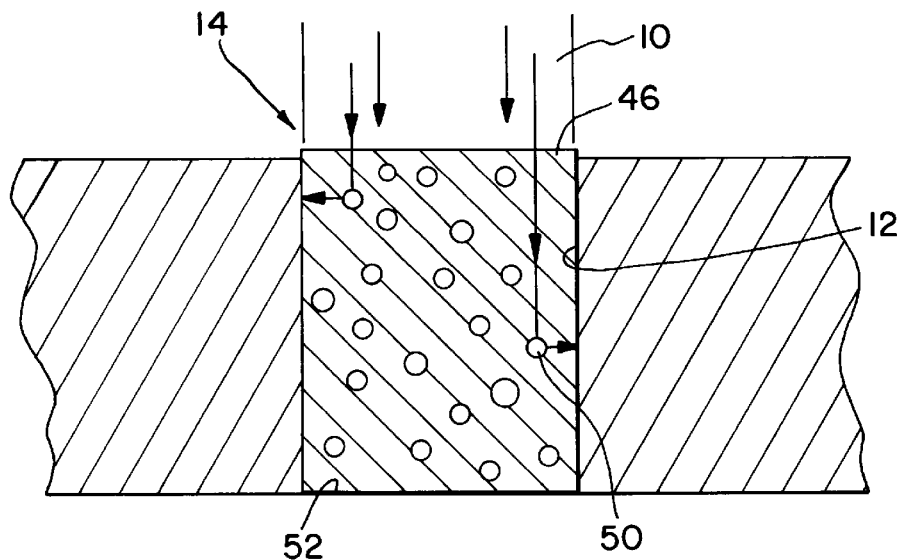
FIG. 7 is another embodiment of the present invention using a transparent member having reflective particles disposed therein.

FIG. 7 shows yet another configuration of the invention, that of a transparent member 46 disposed within a recess 14. Member 46 includes a plurality of reflective particles 50, constructed from pieces or sphere's of metal, such as silver or gold. Alternatively, other types and shapes of reflective particles 50 may be used such as coated or uncoated spheres of glass or other materials and hollow or solid pieces. Another method of providing reflections inside the medium is creating voids with reflective surfaces. Reflective particles 50 cause portions of beam 10 to become incident, via reflection or refraction, on to hidden surface 12 of recess 14. Transparent member 46 further includes a reflective surface 52 to reflect beam 10 back through member 46 a second time so that more energy may be applied by reflective particles 50 to hidden surface 12.

For simplicity and clarity of the invention, the transparent overlay layer normally used in laser shock processing has not be included in the drawings.

Figure 8:
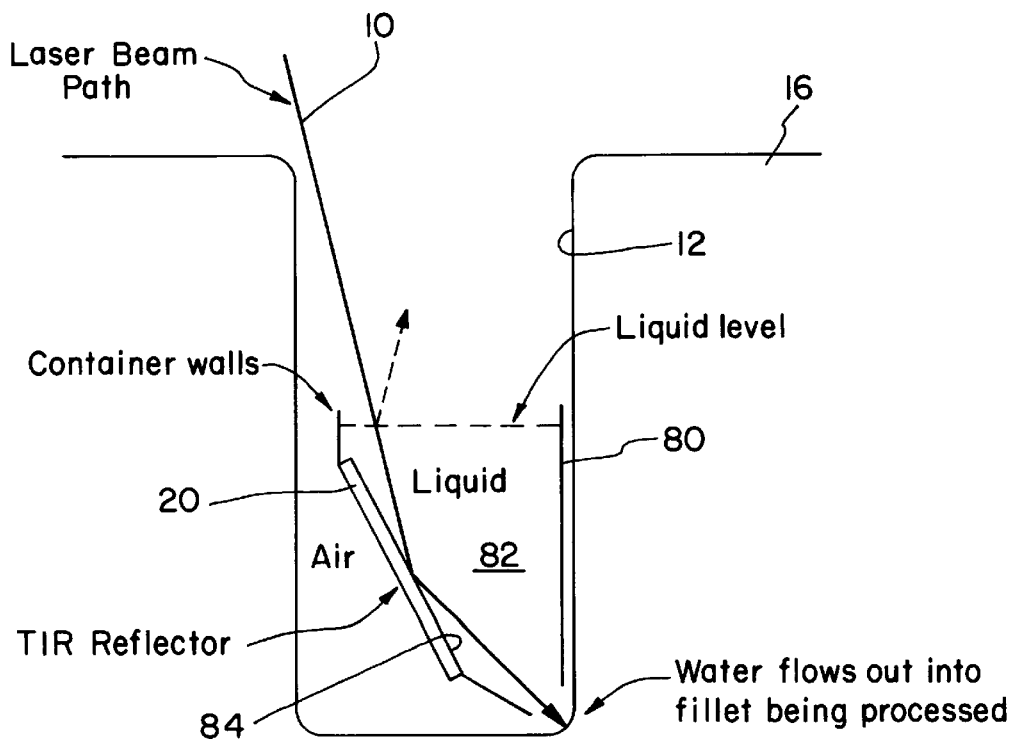
FIG. 8 is another embodiment of the present invention using a reflector disposed in a liquid within a container, this embodiment uses total internal reflection (TIR) to deflect the beam closer to an optimum angle.
Figure 9:
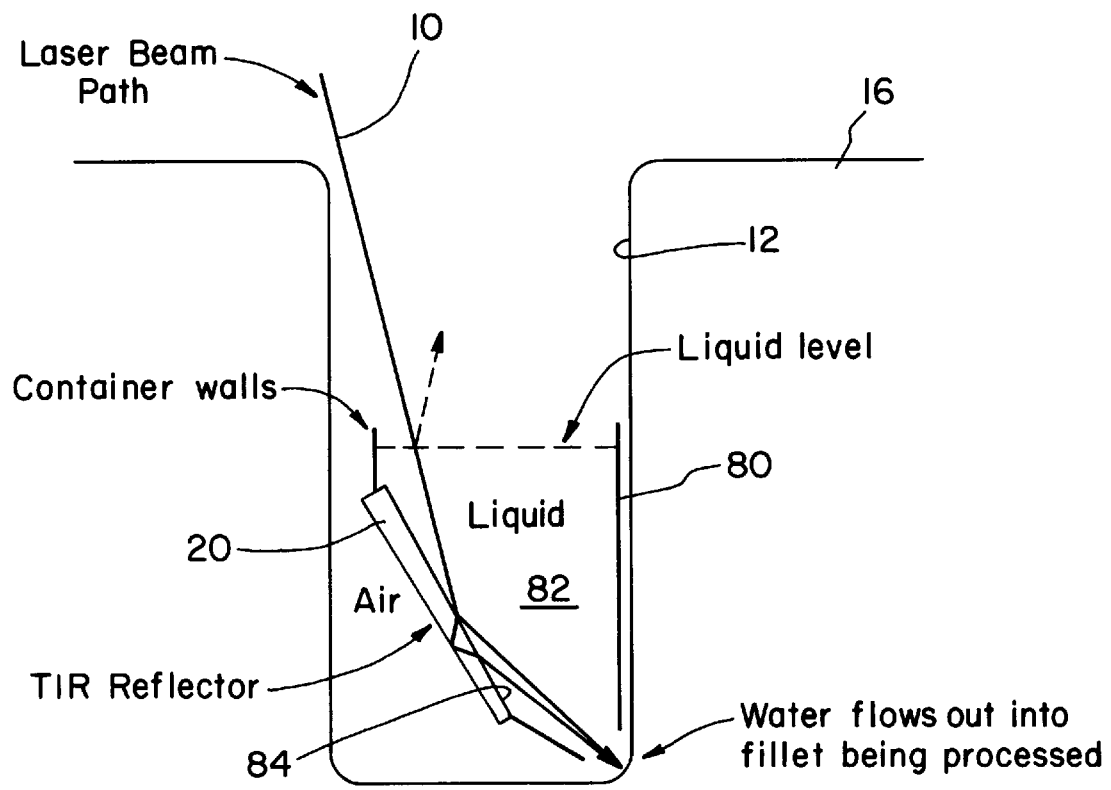
FIG. 9 is another embodiment of the present invention using a reflector disposed in a liquid within a container, this embodiment uses a two surface total internal reflection (TIR) reflector to deflect the beam closer to an optimum angle.

Another embodiment of the invention is shown in FIGS. 8 and 9, in which a container 80 is used to hold both reflector element 20 and a liquid 82. As shown in FIG. 8, if the index of refraction of the liquid 82 is larger than the index of refraction of element 20, the liquid/reflector interface 84 will be totally reflecting and none of laser beam 10 will enter the reflector element 20. If the liquid overlay 82 has a lower index of refraction that reflector element 20, a wedged shaped reflector element 20, as shown in FIG. 9, may be used to overlay the spots created on workpiece 16. A wedged shaped reflector is used since a parallel plate reflector would result in two overlapped spots on the workpiece, caused by the reflection from two surfaces.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser processing method for processing a hidden surface of a workpiece, the hidden surface disposed within a recess having an opening, the method comprising the steps:

inserting a reflective member having a plurality of reflecting particles therein, into the recess, said step of inserting a reflective member comprises inserting a transparent member, having the plurality of reflecting particles therein, into the recess; and directing a pulse of coherent energy to reflect off of said reflective member and impact the hidden surface of the workpiece to create a shock wave.

2. The laser processing method of claim 1, wherein said transparent member includes a reflective surface on an opposite side thereof relative to said beam.

3. The laser processing method of claim 2, in which said opposite side is an end surface.

* * * * *